(12) United States Patent
Giraud et al.

(10) Patent No.: US 6,480,404 B2
(45) Date of Patent: Nov. 12, 2002

(54) DEVICE FOR PRODUCING ELECTRICITY FROM A THREE-PHASE NETWORK, IN PARTICULAR FOR A ROAD VEHICLE

(75) Inventors: Régis Giraud, Angouleme (FR); Christian Andrieux, Angouleme (FR); Christophe Cester, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 10/023,202

(22) Filed: Dec. 13, 2001

(65) Prior Publication Data

US 2002/0105819 A1 Aug. 8, 2002

(30) Foreign Application Priority Data

Dec. 19, 2000 (FR) .............................. 00 16574

(51) Int. Cl.[7] .......................... H02M 7/00; H02M 5/42; H02M 7/04
(52) U.S. Cl. ........................ 363/124; 363/84; 363/90; 323/222
(58) Field of Search ............................. 363/84, 89, 90, 363/124; 323/222, 223

(56) References Cited

U.S. PATENT DOCUMENTS

| | | | | |
|---|---|---|---|---|
| 3,745,366 A | * | 7/1973 | Simon | 105/61 |
| RE29,579 E | * | 3/1978 | Simon | 307/68 |
| 4,143,280 A | * | 3/1979 | Kuehn et al. | 290/14 |
| 4,281,279 A | * | 7/1981 | Gurwicz | 307/10.7 |
| 4,825,139 A | * | 4/1989 | Hamelin et al. | 322/90 |
| 5,793,625 A | * | 8/1998 | Balogh | 323/222 |
| 5,946,202 A | * | 8/1999 | Balogh | 363/134 |
| 6,323,625 B1 | * | 11/2001 | Bhargava | 322/32 |

* cited by examiner

*Primary Examiner*—Bao Q. Vo
(74) *Attorney, Agent, or Firm*—Schweitzer Corman Gross & Bondell LLP

(57) ABSTRACT

A device for producing electricity, the device comprising a three-phase alternator comprising three windings, a rectifier for converting the AC delivered by the alternator into rectified current, and a voltage-raising chopper using the self-inductance of the alternator to raise the voltage. The device includes a switch unit enabling the three windings to be connected either in a star configuration when the alternator is being rotated to produce electricity, or else to the respective phases of a three-phase network when the alternator is stopped.

10 Claims, 2 Drawing Sheets

DEVICE FOR PRODUCING ELECTRICITY FROM A THREE-PHASE NETWORK, IN PARTICULAR FOR A ROAD VEHICLE

The present invention relates to producing electricity on board vehicles and containers, for example.

BACKGROUND OF THE INVENTION

It is known to produce electricity on board vehicles or containers by means of devices comprising an alternator driven by an engine, a rectifier, and a voltage-raising chopper.

A large number of such on-board electricity-producing devices have been proposed, in particular with the purpose of reducing the weight of the equipment.

Thus, numerous devices have been proposed in which the voltage-raising chopper uses the self-inductance of the alternator, thus making it possible to avoid using a coil specific to the chopper.

In particular, application GB-A-2 289 581 discloses a device comprising a conventional three-phase alternator, a rectifier, and a half-bridge chopper downstream from the rectifier.

U.S. Pat. Nos. 5,793,625 and 4,825,139 describe other devices in which the chopper uses the self-inductance of the alternators.

The installations that are powered electrically by means of the electricity-producing device that is present on board a vehicle or a container are, for example, refrigerator installations.

When the engine is stopped, these installations must be able to continue operating.

OBJECTS AND SUMMARY OF THE INVENTION

The invention seeks to satisfy this need.

The present invention thus provides a novel device for producing electricity, and comprising:

- a three-phase alternator having no motor function, comprising three windings, said alternator having self-inductance;
- a rectifier for converting the alternating current (AC) delivered by the alternator into rectified current;
- a voltage-raising chopper having at least one switch element enabling a higher voltage to be generated across the terminals of the alternator by means of the self-inductance of the alternator; and
- a switch unit enabling the three windings to be connected either in a star configuration when the alternator is being rotated to produce electricity, or else to connect the three windings to respective phases of a three-phase network when the alternator is stopped.

The Applicant company has found that the coils of the alternator can be connected directly to a three phase network in order to power the rectifier.

There is therefore no need to provide a rectifier other than the rectifier provided for the alternator, thus providing savings in weight and cost, and increases in reliability and simplicity.

In addition, by having the chopper present downstream from the alternator it is possible to deliver variable power to the load circuit(s), and thus cause them to operate under conditions that are best suited to circumstances.

In particular, the device can power a regulator serving to vary both the frequency f and the voltage U while keeping the ratio U/f constant, for example.

This makes it possible for example, to cause a constant torque motor to operate at variable power regardless of the frequency and the voltage of the power supply network, and without any increase in mass or volume.

A motor delivering power of 5.5 kilowatts (kW) at 400 volts (V) and at 50 hertz (Hz) can have its power raised to 6.6 kW at 460 V and 60 Hz and to 7.5 kW at 500 V and 70 Hz.

In addition, by connecting load circuits via the rectifier and the windings of the alternator, in particular, it is possible to improve the power factor.

It is preferable to use an alternator having eight poles and for the switching element to operate at a switching frequency lying in the range 3 kilohertz (kHz) to 15 kHz, while preferably remaining below 8 kHz and more preferably equal to 7.5 kHz.

The Applicant company has found that it is possible to make the device of the invention operate at such a switching frequency with satisfactory overall efficiency.

The self-inductance in percentage terms per phase of the alternator is defined by the formula $L\omega I_N/V_0$, where L is the self-inductance of the alternator, $\omega$ is the angular frequency, $I_N$ is the nominal current at a given speed, e.g. 1500 revolutions per minute (rpm), and $V_0$ is the unloaded voltage of the alternator at said speed, and it preferably lies in the range 15% to 40%, and more preferably in the range 20% to 30%.

In a preferred embodiment corresponding to power of about 10 kW, with the voltage being 294 volts between phases at 3000 rpm, the inductance per phase of the alternator is less than or equal to 2 millihenrys (mH), preferably less than equal to 1.5 mH, which corresponds to inductance in percentage terms lower than 30%.

Still in an embodiment corresponding to power of about 10 kW, for a voltage of 294 volts between phases at 3000 rpm, the inductance per phase of the alternator is greater than or equal to 1 mH, which corresponds to inductance in percentage terms greater than 20%.

The Applicant company has found that these values of inductance and frequency make it possible with an eight-pole alternator to keep the losses due to current harmonics to a level that is particularly low.

The alternator is preferably a permanent magnet alternator.

Also preferably, the chopper is downstream from the rectifier, thus making it possible to use a single transistor, for example an insulated gate bipolar transistor (IGBT).

This single transistor can be cooled easily by circulating a liquid coolant, whereas in conventional devices where the choppers have a plurality of transistors, cooling is made more difficult by the number of transistors, since they cannot be mounted on a common cooler without giving rise to problems of insulation.

The switching frequency is preferably constant, thereby simplifying the control electronics.

The chopper can be connected directly to the rectifier without a coil between them.

In a preferred embodiment, the chopper feeds at least one inverter controlled by a control circuit receiving information representative of the speed of rotation of the rotor of the alternator.

The control circuit can thus take account of the power available for the loads connected to the inverter, and can control the operation thereof accordingly.

By way of example, the device makes it possible to provide electrical power to a refrigerator system having at least one motor.

BRIEF DESCRIPTION OF THE DRAWINGS

The invention will be better understood on reading the following detailed description of a non-limiting embodiment of the invention, and on examining the accompanying drawings, in which.

MORE DETAILED DESCRIPTION

Figure 1:
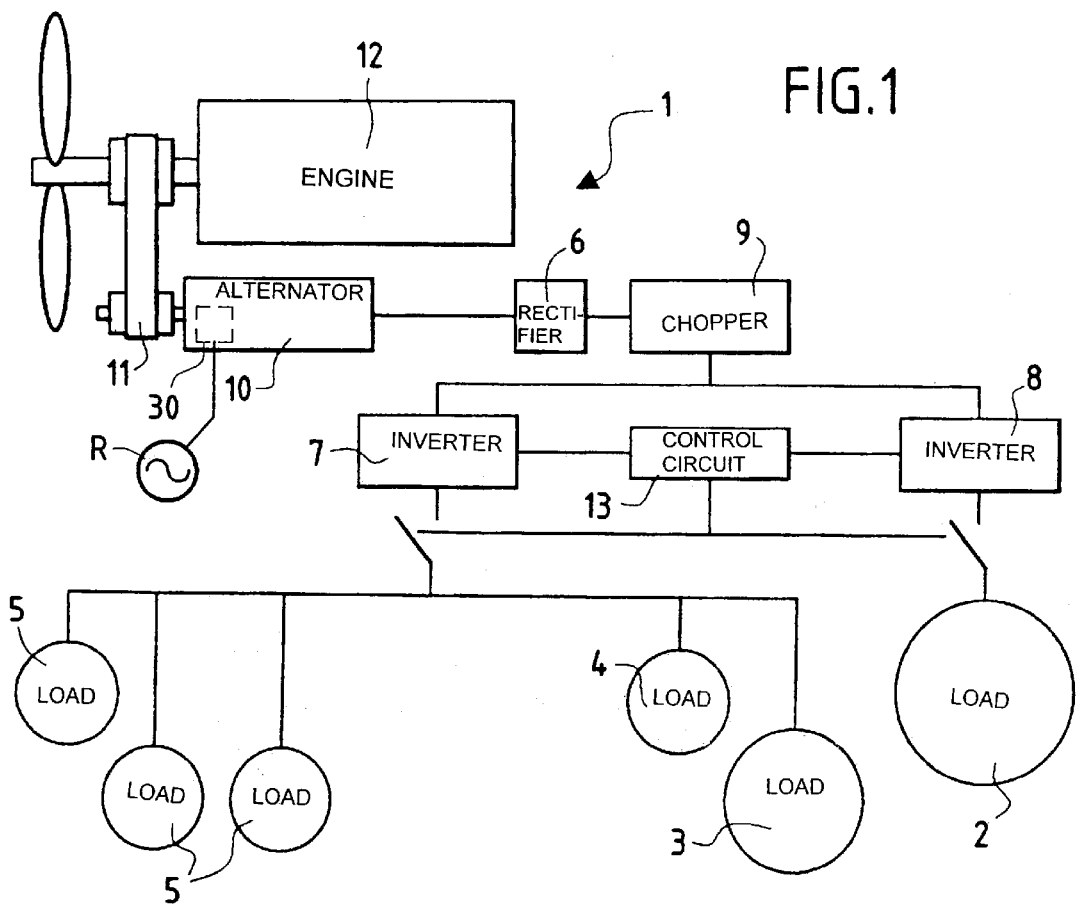
FIG. 1 is a block diagram of a power system on board a motor vehicle and including a device for producing electricity in accordance with the invention.
Figure 2:
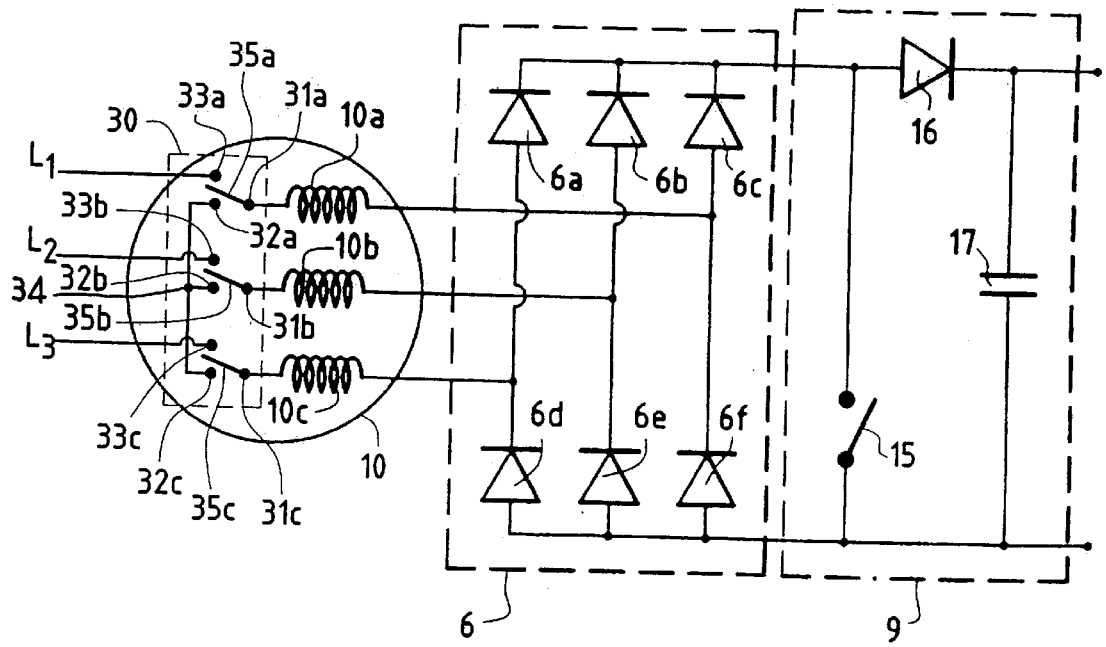
FIG. 2 is a simplified electrical circuit diagram of the electricity producing device of the invention.

The power system 1 shown in FIG. 1 includes various loads 2 to 5 driven by electric motors, such as motor-driven fans or pumps.

Two possible modes of operation are possible, namely a self-contained mode of operation in which power is delivered by an engine 12, e.g. a diesel engine whose speed of rotation will vary, typically over the range 600 rpm to 3600 rpm, and a non-self-contained mode of operation in which the engine 12 is stopped and power is taken from a three-phase electricity network R, e.g. 400 V/50 Hz or 460 V/60 Hz, or some other combination.

The loads 2 to 5 are powered with three-phase electricity at constant or variable frequency by two inverters 7 and 8 themselves powered with direct current (DC) by a voltage-raising chopper 9 connected to a rectifier 6, itself connected to an alternator 10 whose rotor can be rotated by the engine 12 via a transmission 11.

The transmission 11 makes it possible to multiply the speed of rotation of the rotor by a factor of 2 or 3, for example, such that the alternator 10 can be rotated at a speed lying in the range 1500 rpm when the engine is idling to more than 5000 rpm when the engine 12 is running at high speed.

The system 1 includes a control circuit 13 receiving in particular information representative of the speed of rotation of the rotor of the alternator 10 so as to control the various loads 2 to 5 as a function of the power available to the inverters 7 and 8.

The alternator 10 is a three-phase alternator having three coils 10a, 10b, and 10c, each having self-inductance L.

Each of the three coils 10a, 10b, and 10c is connected to a respective terminal 31a, 31b, and 31c of a switch unit 30 having switches 35a, 35b, and 35c caused to operate simultaneously and each associated with a respective one of the coils 10a, 10b, and 10c.

The terminals 31a, 31b, and 31c can be connected selectively by the switches 35a, 35b, and 35c either to respective terminals 32a, 32b, and 32c, or else to respective terminals 33a, 33b, and 33c, depending on the selected mode of operation.

The terminals 32a, 32b, and 32c are connected to a midpoint 34 while the terminals 33a, 33b, and 33c are connected respectively to the three phases $L_1$, $L_2$, and $L_3$ of the three-phase network R.

The switches 35a, 35b, and 35c of the unit 30 can be mechanical or electronic and they can be actuated manually or automatically so as to switch at will between a self-contained mode of operation and a non-self-contained mode, and vice versa.

Switching is preferably lockable in each position, with changeover from one position to the other requiring a key, for example.

When an electronic switch unit is used, it is preferable to take care to ensure that switchover is synchronized with electrical magnitudes of the three-phase network and/or of the alternator so as to disturb the operation of the load circuits as little as possible.

In the self-contained operating mode, the coils 10a, 10b, and 10c are connected in a star configuration to the midpoint 34, while in the non-self-contained mode of operation the rectifier 6 is powered by the network R via the coils 10a, 10b, and 10c without adding an external rectifier bridge.

The power delivered can be constant, since it is regulated by the chopper 9.

In conventional manner, the rectifier 6 comprises six diodes 6a to 6f connected to deliver a rectified voltage.

The voltage-raising chopper 9 has an electronic switch 15 suitable for short-circuiting the output of the rectifier 6, a diode 16 and an output storage capacitor 17.

The chopper 9 is a parallel type chopper and uses the self-inductance of the alternator 10 to store reactive energy.

In the embodiment described, the electronic switch 15 is constituted by a single IGBT controlled by an electronic control circuit to switch at a constant switching frequency, the electronic control circuit being made in conventional manner and not being shown in order to clarify the drawing.

The electronic control circuit is advantageously arranged so as to modify the duty ratio of the control signal to the electronic switch 15 as a function of the output voltage from the voltage-raising chopper 9 so as to regulate this voltage on a reference value.

In the particular embodiment described, the switching frequency is 7.5 kHz.

Figure 3:
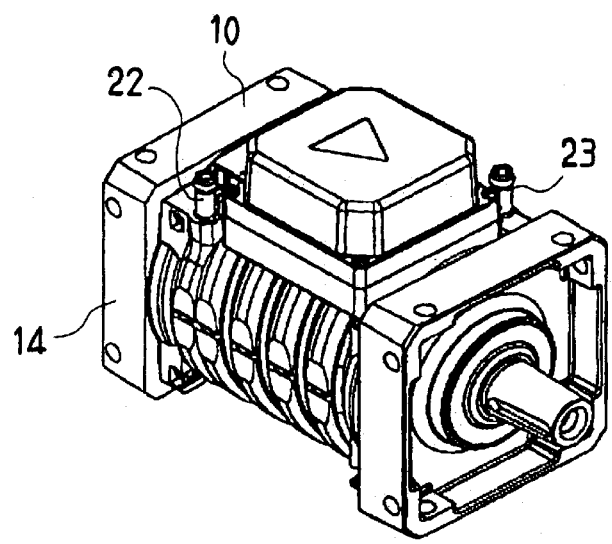
FIG. 3 is a perspective view showing the alternator in isolation.
Figure 4:
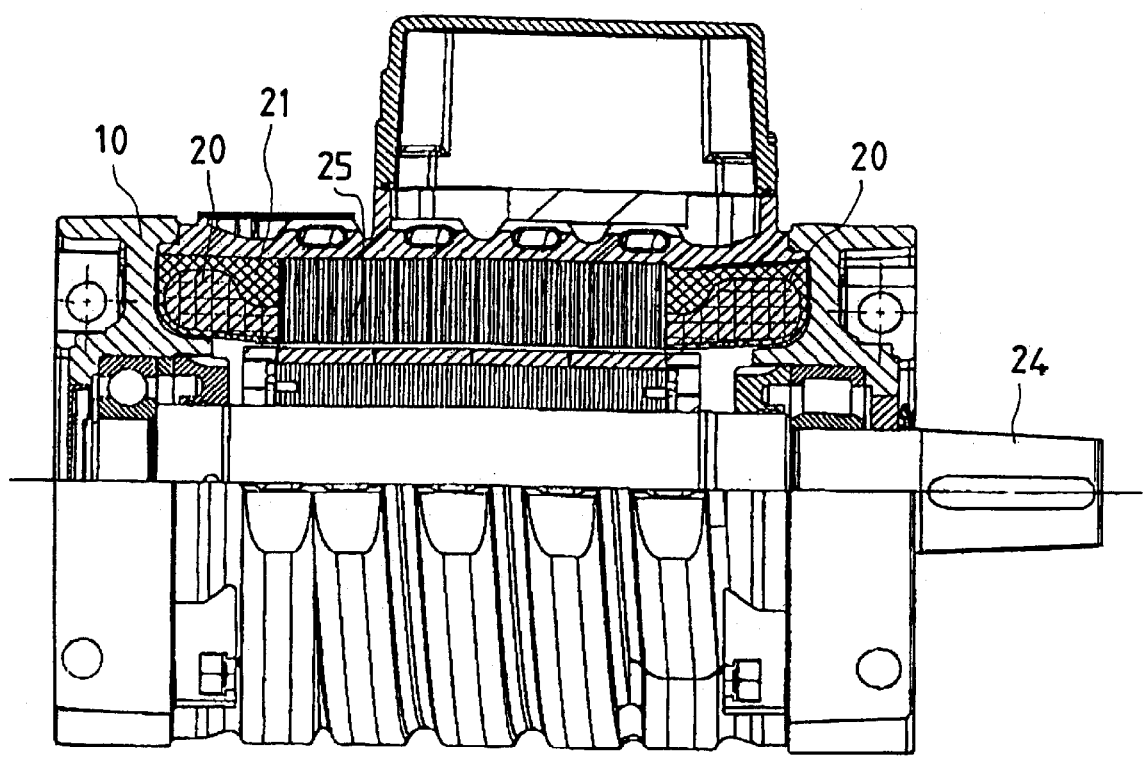
FIG. 4 is a side view in axial half-section of the FIG. 3 alternator.

FIGS. 3 and 4 show the alternator 10 on its own.

The alternator 10 comprise a casing 14 designed to be cooled by a liquid and provided for this purpose with coupling endpieces 22 and 23 for connection to a cooling water circuit.

In the embodiment described, the alternator 10 is a three-phase alternator having eight poles, each of the three coils 10a, 10b, and 10c being wound in conventional manner in the slots of the stator 25 of the alternator 10 which stator has a total of forty-eight slots.

The rotor 24 has permanent magnets in the embodiment described, four magnets per pole.

It is preferable to use magnets having a remanent field that is fairly weak but that has good coercitivity ($B_r$ close to 1.1 Teslas (T) nominal at 20° C. and $H_{cj}$ close to 900 kiloamps per meter (kA/m) nominal at 150° C.).

The thickness of the magnets used is close to 5 mm, for example.

Preferably, the stator laminations are made of silicon alloy, and the pole pieces are about 115 mm long.

Still in the embodiment described, the number of turns is equal to 20.

Furthermore, as can be seen in FIG. 4, the winding ends 20 formed by the wires of the coils outside the pole pieces of the stator and projecting from opposite ends thereof are embedded in a conductive resin 21, thus helping to reduce losses.

In the embodiment described, the power of the device is about 10 kW and the self-inductance L per phase of the alternator is about 1.3 mH.

The switching frequency of the electronic switch 15 and the self-inductance of each phase of the alternator make it possible simultaneously to have switching losses in the electronic switch 15 and a level of harmonics that are compatible with the desired performance.

The self-inductance per phase is selected to make it possible firstly to keep harmonics at a relatively low level given the switching frequency of the electronic switch, and secondly to avoid a drop in voltage due to the spreading phenomenon which is harmful for the output power of the voltage-raising chopper.

In percentage terms, the inductance is selected to lie in the range 20% to 40%, and preferably lies in the range 20% to 30%.

Naturally, the invention is not limited to the embodiment described above.

In particular, it is possible for the electronic switch 15 to be constituted by one or more suitable components capable of short-circuiting the output of the rectifier. Nevertheless, it is advantageous to use a single component since it is then easily cooled by circulating a liquid coolant, whereas when multiple components are used liquid cooling poses problems of electrical insulation between the various components.

It is not essential to coat the winding ends of the alternator stator in a conductive resin, but that presents the advantage of making it easier to cool the coils and to increase the power of the alternator per unit weight.

Similarly, using permanent magnets to excite the stator of the alternator is a solution that is preferred but it would not go beyond the ambit of the present invention to use separate excitation.

A plurality of alternators 10 can be disposed side by side and driven by a common shaft in order to increase the delivered power.

Finally, it is possible by means of the invention to use a single rectifier, regardless of whether the alternator is being rotated or the engine is stopped.

Feeding the alternator with AC serves to lock the alternator in position and to limit losses and forces.

No external self-inductance is needed.

The weight of the on-board equipment can remain relatively low.

What is claimed is:

1. A device for producing electricity and comprising:

a three-phase alternator having no motor function, comprising three windings, said alternator having a self-inductance;

a rectifier for converting the alternating current delivered by the alternator into rectified current;

a voltage-raising chopper having at least one switch element enabling a higher voltage to be generated across the terminals of the alternator due to the self-inductance of the alternator; and a switch unit enabling the three windings to be connected either in a star configuration when the alternator is being rotated to produce electricity, or else to connect the three windings to respective phases of a three-phase network when the alternator is stopped.

2. A device according to claim 1, wherein the alternator has eight poles and in which the at least one switch element operates at a switching frequency lying in the range 3 kHz to 15 kHz.

3. A device according to claim 2, wherein said switching frequency is less than 8 kHz.

4. A device according to claim 3, wherein said switching frequency is about 7.5 kHz.

5. A device according to claim 1, wherein $L\omega I_N/V_0$ lies in the range 0.15 to 0.4, where L is the self-inductance per phase of the alternator, $\omega$ is angular frequency, $I_N$ is the nominal current at a given speed, and $V_0$ is the unloaded voltage of the alternator at said speed.

6. A device according to claim 1, wherein $L\omega I_N/V_0$ lies in the range 0.2 to 0.3, where L is the self-inductance per phase of the alternator, $\omega$ is the angular frequency, $I_N$ is the nominal current at a given speed, and $V_0$ is the unloaded voltage of the alternator at said speed.

7. A device according to claim 1, wherein the rectifier has three input terminals connected to the alternator windings and two output terminals connected to the switch element.

8. A device according to claim 7, wherein the switch element is constituted by a single IGBT.

9. A device according to claim 1, connected to a refrigerator system including at least one motor.

10. A device according to claim 9, including a regulator enabling both the frequency and the voltage U of said motor to be varied while keeping the ratio U/f constant.

* * * * *